(12) United States Patent
Gray (10) Patent No.: US 8,973,597 B2
(45) Date of Patent: Mar. 10, 2015

(54) AUXILIARY TANK AND MAINS WATER SUPPLY SYSTEM

(76) Inventor: Ian Gray, Coorparoo (AU)

( * ) Notice: Subject to any disclaimer, the term of this patent is extended or adjusted under 35 U.S.C. 154(b) by 855 days.

(21) Appl. No.: 12/998,746

(22) PCT Filed: Dec. 1, 2009

(86) PCT No.: PCT/AU2009/001571
§ 371 (c)(1),
(2), (4) Date: May 26, 2011

(87) PCT Pub. No.: WO2010/063068
PCT Pub. Date: Jun. 10, 2010

(65) Prior Publication Data
US 2011/0220227 A1    Sep. 15, 2011

(30) Foreign Application Priority Data

Dec. 1, 2008 (AU) ................ 2008906223

(51) Int. Cl.
| | |
|---|---|
| E03B 1/00 | (2006.01) |
| F16K 11/07 | (2006.01) |
| E03B 7/04 | (2006.01) |
| E03B 7/07 | (2006.01) |
| G01F 23/68 | (2006.01) |
| G01F 23/74 | (2006.01) |
| G01F 23/76 | (2006.01) |

(52) U.S. Cl.
CPC . *F16K 11/07* (2013.01); *E03B 7/04* (2013.01); *E03B 7/075* (2013.01); *G01F 23/68* (2013.01); *G01F 23/74* (2013.01); *G01F 23/76* (2013.01)
USPC ................ 137/12; 137/112; 137/602; 417/26

(58) Field of Classification Search
CPC .......... F16K 3/24; F16K 11/07; F16K 31/122
USPC ........... 137/101.27, 112, 114, 494, 602, 605, 137/87.03, 12; 417/26, 29
See application file for complete search history.

(56) References Cited

U.S. PATENT DOCUMENTS

| 2,705,501 A * | 4/1955 | Fritzsch ..................... 137/112 |
| 3,073,332 A * | 1/1963 | Strader ..................... 137/112 |
| 7,066,197 B1 * | 6/2006 | Gray et al. ................. 137/357 |

FOREIGN PATENT DOCUMENTS

| AU | 2003262296 | 6/2004 |
| AU | 2008200314 | 8/2008 |

(Continued)

*Primary Examiner* — John K Fristoe, Jr.
*Assistant Examiner* — R. K. Arundale
(74) *Attorney, Agent, or Firm* — Roger N. Chauza, PC (57) ABSTRACT

A water supply system that supplies water to a plumbing system from either a mains supply, or an auxiliary supply. In a default state, a shuttle valve is pressure balanced and couples water from the mains supply to the plumbing system via mains inlet port and outlet port, and in another state the shuttle valve is pressure unbalanced and moved so that auxiliary water is coupled to the plumbing system via an auxiliary inlet port and the outlet port of the shuttle valve. Water is drawn from an auxiliary tank and coupled to the plumbing system when two conditions exist, namely when water is demanded, as sensed by flow sensor, and when water is available from the auxiliary supply, as sensed by float system. Water pressure at the auxiliary inlet port causes the shuttle to move from the default state and couple water from the auxiliary inlet port to the outlet port and thus to the plumbing system. When either of the two conditions are not met, the shuttle valve remains in the default state and couples mains water from the mains inlet port to the outlet port and thus to the plumbing system.

20 Claims, 5 Drawing Sheets

(56) References Cited

FOREIGN PATENT DOCUMENTS

| DE | 3819330 | 12/1989 |
| DE | 4416038 | 11/1995 |
| EP | 1138836 | 10/2001 |
| GB | 2242926 | 10/1991 |
| WO | WO 2004/020749 | 3/2004 |
| WO | WO 2004/090398 | 10/2004 |
| WO | WO 2008/095242 | 8/2008 |

* cited by examiner

AUXILIARY TANK AND MAINS WATER SUPPLY SYSTEM

BACKGROUND

Water is a resource that is necessary for the daily existence of living things. A supply of water is generally provided to every building, whether it be a residential home in the city or country, an office building, or other habitat where people either live or work. Water is usually stored in a reservoir, such as a tower, lake, river, etc., and then purified and coupled under pressure through a pipe network to the buildings. The pipe network can be a large main from which smaller laterals are routed to the individual buildings. With such a network, fresh water is constantly available to every person by simply turning on a faucet, or the like.

The storage of water in a reservoir and the purification of the same comes at a cost to the consumer. In contrast, rain water is available in many regions of the world and when collected from a rooftop and stored in an auxiliary tank, or other container near the building, can be used in a very cost effective manner. Indeed, rain water can be used in many homes as an auxiliary source of water. Thus, when the auxiliary supply of rain water is available, it can be switched to the plumbing system of the home for consumption, and when exhausted, the supply of water via the mains can be switched into operation to provide a continual supply of water.

A valve is employed to enable pressurised water to be supplied from the auxiliary tank to the plumbing system when such supply is available, but permits the use of the mains water when the auxiliary tank water is depleted and ceases to be available. The switching between the auxiliary water tank and the mains water should be automatic and should be achieved while maintaining separation between the two water sources.

Most water pumping systems that pump water from a tank sense the pressure in the downstream side of the pump and turn the pump on when the pressure drops below a threshold pressure, or below a certain water flow rate. In this type of water pumping system, unless a large accumulator is used for the intermediate storage of water, the pump turns on and off frequently. This operation loads the pump and is noisy.

It can be seen that a need exists for a water supply system where the pump is only turned on when a significant flow level in the water demand is reached, and when there is sufficient water in the auxiliary water tank. This feature minimises pump cycling and economises the cost of the water, as the less costly water in the auxiliary tank is used first, and when depleted, the more costly mains water is used.

SUMMARY OF THE INVENTION

A water supply system according to the invention permits the use of mains water and water stored in an auxiliary reservoir (tank) to be supplied to a building's reticulation system, while maintaining separation between the two water sources, with minimal pressure loss despite the different water supply pressures versus the flow characteristics of the mains and the pump.

According to a feature of the invention, an auxiliary tank typically stores runoff water from a roof area of the building. The water of the auxiliary tank can be coupled via a pump to an auxiliary inlet port of a three port valve. Alternatively, if the tank has sufficient elevation, the pressure of the water in the auxiliary tank can be coupled without a pump to the auxiliary inlet of the valve. A mains inlet port of the valve is connected to the mains water supply. The outlet port of the valve is connected via a flow sensor to the supply water inlet of the building. This water supply inlet would normally be connected to the plumbing system of the building. In addition to the valve and pump, the system includes a method for detecting water in the auxiliary reservoir. This can be detected by a water level sensor, such as a float switch or pressure transducer.

The water supply system according to the invention is configured with a three port valve that supplies water from the water mains inlet port to the outlet port when the water pressure at the auxiliary inlet port is below a predetermined minimum, indicating the water in the auxiliary tank has been exhausted. When the water at the auxiliary inlet port of the valve becomes pressurised above a predefined threshold, due to the pump being activated, the valve responds to the pressure and automatically switches from the mains water inlet to the auxiliary inlet, thereby connecting the auxiliary water tank to the outlet port and thus to the plumbing system of the building.

In the preferred embodiment, the three port valve comprises a shuttle valve that is spring biased to a default position. The shuttle of the valve has equal size areas and is thus pressure balanced with respect to mains water pressure so that any variation in mains water pressure will not overcome the spring force and move the shuttle. Accordingly, when the pressure of the water from the auxiliary tank, and thus at the auxiliary inlet of the valve is below a specified threshold, the spring loaded shuttle remains in the default position where the mains water supply inlet is connected to the outlet port of the valve. The shuttle of the valve has an end section exposed to the auxiliary inlet port that is larger in diameter than the remainder of the shuttle. This end of the shuttle is therefore unbalanced with respect to pressure at the auxiliary inlet port. Accordingly, when pressurised water from the auxiliary water tank pump exceeds a specified value, the pressure on the enlarged end section of the shuttle exceeds the spring pressure. When this condition exists, the unbalanced pressure on the shuttle forces it to move. When moved against the spring force, the shuttle closes the port between the mains inlet port and the outlet, and opens the auxiliary inlet port to the outlet port of the valve. Any back flow of water from the pumped auxiliary supply is prevented from entering into the mains supply of water. A minor interruption in the supply of water may be experienced during the switching of the valve.

An optional non-return valve and hydraulic accumulator can be installed between the outlet port of the shuttle valve and the flow sensor to remove the brief interruption in the supply of water. This option enables the system to operate in the absence of mains water pressure. If this option is employed, then a pressure sensor can be used downstream of the non-return valve, and to also provide an additional signal to control the pump. In this case, the pump can be turned on if the water pressure at the auxiliary inlet of the valve drops below a predefined threshold value, and provided there is water in the auxiliary reservoir.

The flow switch can be of many forms, but one embodiment constitutes a simple modified flap type of non-return valve. With this type of flow switch, the flap has attached to it a magnet. The body of the flow switch has fitted to it a reed switch. With this arrangement, the reed switch is closed when the flap is in the no flow position, and opens when there is flow through the flow switch. The flow switch could also be configured to have the opposite logic arrangement.

The water level sensor used to detect water in the auxiliary tank may comprise various types of float switches or pressure sensors. According to the preferred embodiment, the sensor includes a float which has a magnet attached thereto. The float is held within a body of the water level sensor, and the body of the sensor has fitted to it a reed switch. The water level sensor is configured so that the contacts of the reed switch are closed when the water level in the auxiliary tank has dropped below a specified level, and are open when the water level in the auxiliary tank is above the specified level. This logic can optionally be reversed. The water level sensor is connected to the water outlet of the tank. In order to avoid the hydrodynamic effects of flow in the water outlet conduit from the tank, the float chamber in which the float is captured is hydraulically connected to the auxiliary tank by means of a small diameter tube that passes within the outlet conduit into the bottom of the auxiliary tank. The upper portion of the float chamber is vented to a sight tube so that the level of water in the auxiliary tank can be readily observed. In an alternative embodiment it is possible to have the vent to atmosphere in place of the site tube and to fit a seal to the top of the float so that when the float rises it seals this port but still performs the same function.

A programmed controller receives the output of the flow switch and the water level sensor and processes the electrical signals to turn on the water pump when certain conditions exist. The preferred logic or conditions that should exist for turning on the water pump is when there is water in the auxiliary tank and when there is a demand for water by the user of the water supply system. If either of these criteria is not met, the pump either remains off or is turned off. In a preferred form of the water supply system, a delay is incorporated into the controller logic so that the water pump stays on for a few seconds after a cessation in the water flow, and there is a specified delay in time before the water pump is turned on. The delay periods prevent undue pump cycling for small and intermittent demands. The delays also prevent oscillation during a break in water supply as the shuttle valve moves from the mains inlet port to the auxiliary inlet port, which would otherwise cause the flow switch to indicate no flow, thus causing the pump to be turned off.

From the foregoing, the water supply system operates in a default mode when the mains water is coupled through the three port valve to the outlet port. When a demand for water causes a flow through the flow switch, and sufficient water is detected in the auxiliary tank, the controller waits for a short period of time before turning on the pump. As the pump builds up pressure at the auxiliary inlet port of the three port valve, the pressure forces the shuttle valve to shift so that the water from the auxiliary supply is coupled from the auxiliary inlet port of the valve to the outlet port. When either the auxiliary water tank level sensor falls below its predefined threshold, or the flow sensor ceases to sense a flow of water therethrough, the controller waits for a short period of time and then turns the pump off. When this condition occurs, the pressure at the auxiliary inlet port of the valve drops, whereupon the shuttle of the valve moves to its default position where the mains inlet port is coupled to the outlet port.

In the event of an electrical power failure to the water supply system, the flow sensor, tank level sensor, controller and pump are not powered and the three port valve reverts to the default condition where water from the mains inlet port is delivered to the outlet port.

In the event of a mains water failure, the controller is configured to be manually switched to turn on the pump to deliver water from the auxiliary tank. In an alternative embodiment, a non-return valve and a hydraulic accumulator can be placed between the outlet of the three port valve and the flow switch. With this arrangement, in the event of a failure in the mains water, flow can be delivered by the hydraulic accumulator on demand from the auxiliary water supply system, thus triggering the flow switch and causing the controller to turn on the pump. The control can be augmented by the use of a pressure sensor placed in the downstream plumbing. The pressure sensor overrides the flow switch to turn on the pump in the event of a drop in pressure, provided that sufficient water exists in the auxiliary tank.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which.

DETAILED DESCRIPTION

Figure 1:
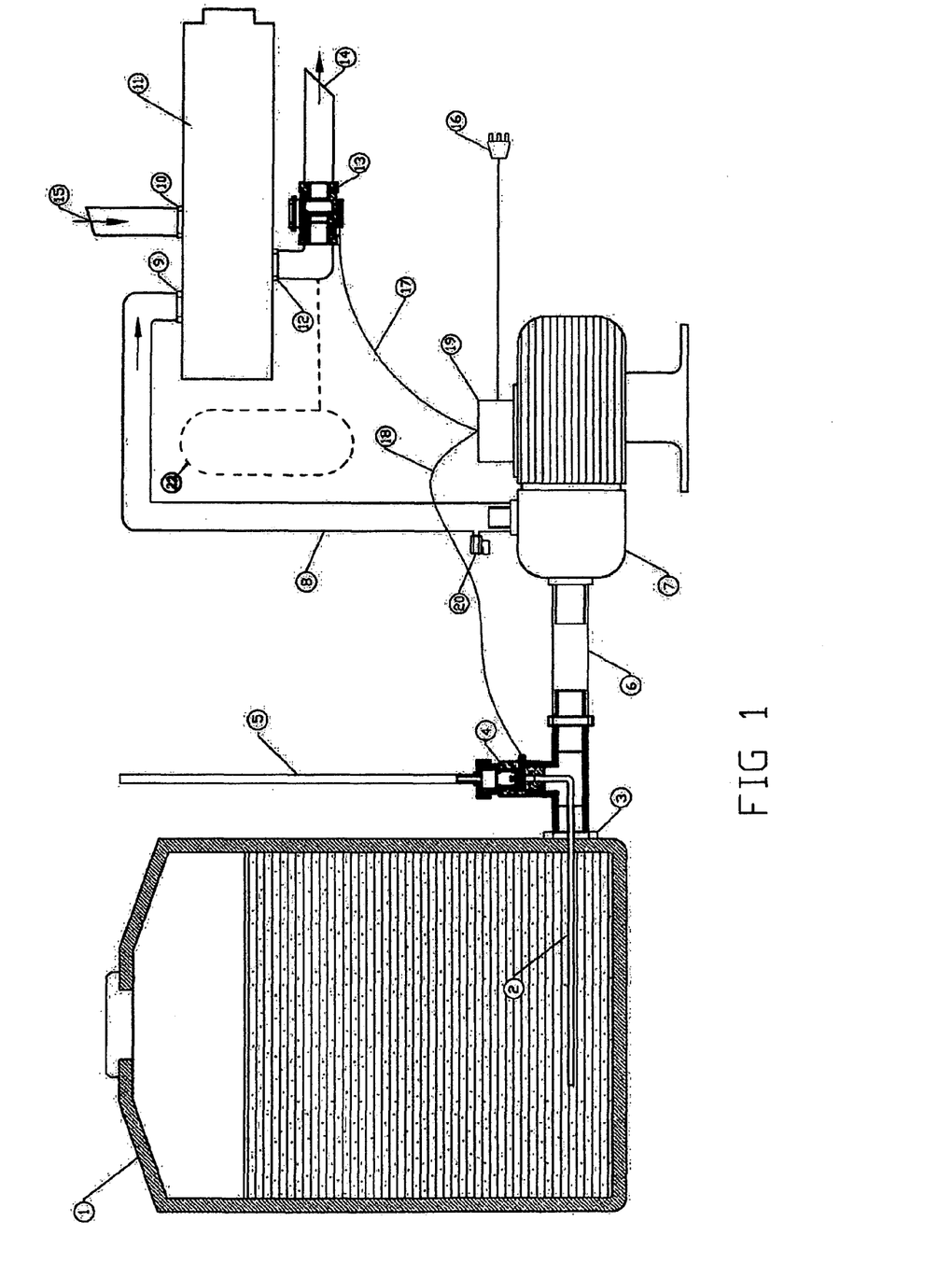
FIG. 1 illustrates a water supply system constructed according to an embodiment of the invention.

FIG. 1 illustrates a water supply system constructed according to the principles and concepts of the invention. Shown is an auxiliary water tank (1) for storing an auxiliary supply of water. The auxiliary water tank (1) accumulates runoff rain water from a roof, or can store water pumped therein from another source. The auxiliary tank (1) is equipped with an outlet port (3) located at the bottom of the tank (1). The outlet port (3) is connected by a conduit (6) to a pump (7). The pump (7) is preferably driven by an electric motor (not shown). A tube (2) protrudes through the outlet port (3) of the tank (1) and is connected to a level detection system, shown as a float system (4). The tube (2) connects the float system (4) to the water in the auxiliary tank (1) so that the static head in the tank (1) can be detected without being affected by the dynamic flow that would otherwise adversely affect the float system (4) if it were directly connected to the conduit (6). Connected to the top of the float system (4) is a vented sight tube (5). Also connected to the float system (4) is an electrical cable (18) which provides a signal to the controller (19) indicative of the level of the water in the tank (1). The controller (19) is shown mounted to the top of the pump (7).

A conduit (8) connects the outlet of the pump (7) to the auxiliary inlet port (9) of a shuttle valve (11). The conduit (8) includes a bleed valve (20) to de-air the pump (7) during priming thereof. The supply (15) of the mains water is connected to a mains inlet port (10) of the shuttle valve (11). An outlet port (12) of the shuttle valve (11) is connected to a flow sensor (13) which is connected to the plumbing system of a building by a conduit (14). An optional accumulator (22) can be connected between the outlet port (12) of the shuttle valve (11) and the flow sensor (13). An electrical cable (17) carries signals indicative of the presence or absence of water flow from the flow sensor (13) to the controller (19).

Electricity from an electrical power source is coupled to the controller (19) by a cable and plug (16). The controller (19) is programmed or wired to carry out the logic described herein in response to the electrical signals input thereto, and to switch the electricity from the plug (16) to the pump (7) to turn it on.

In operation, the static water level in the auxiliary tank (1) is sensed by a float in the float system (4) via the tube (2). A signal indicating whether the tank has a water level above or below the location of the float in the float system (4) is conveyed to the controller (19) by cable (18). A demand by the user for water from conduit (14) is initially supplied by the mains water (15) passing through the shuttle valve (11) in its default condition from the mains inlet port (10) to the outlet port (12). The flow sensor (13) detects water flow if it is of sufficient magnitude and sends a signal via cable (17) to the controller (19). If sufficient water is detected in the auxiliary tank (1) by the float system (4), and there is sufficient water flow detected by the flow sensor (13), and the demand continues for a pre-set period of time, then the pump (7) is turned on by the controller (19). The pump (7) pressurises the water from the auxiliary tank (1) and couples the same to the auxiliary inlet port (9) of the shuttle valve (11). In doing so, the shuttle valve (11) switches from the default mode and delivers water from the auxiliary tank (1) via the pump (7) and flow sensor (13) to the plumbing system via the outlet conduit (14). When either the water level in the auxiliary tank (1) drops below a specified level, as detected by the float system (4), or the water flow drops to a low level as detected by the flow sensor (13), or both occur, then the controller (19) turns the pump (7) off after a pre-programmed delay.

In another embodiment, the auxiliary water tank (1) can be located at an elevation sufficiently high, as compared to the elevation of the building supplied with the auxiliary water, so that a sufficient water head is generated without the use of a pump (7). With this arrangement, the water pressure produced at the outlet (3) of the auxiliary tank (1) would be sufficient to operate the shuttle valve (11) without being pressurised by a pump (7). The pressure of the water at the outlet (3) of the tank (1) can be used as a measure of the availability of water in the tank (1). Preferably, there would be an electrically operated valve (not shown) at the outlet (3) of the tank (1) that could be turned on and off by the controller (19). When the electrically operated valve is closed, there is no pressure at the auxiliary inlet port (9) of the shuttle valve (11) and thus the valve (11) remains in the default state.

While the auxiliary reservoir is illustrated as a tank (1), any other type of reservoir can be employed, including a lake, river, pond, underground cistern, etc. In some instances, the users of water employ two sources of water, namely a purified form for drinking and food preparation, and a grey water form for use in carrying wastes to a sewer system. Depending on the purity of the auxiliary water source, the water supply system of the invention can be used to couple the auxiliary water (when available) only to the grey water system of the building, and otherwise couple the more costly mains water thereto when the auxiliary water is exhausted. This water supply system configuration conserves the more costly purified water from the mains water when the auxiliary water is available, especially when used for sewage disposal purposes.

The water supply system of the invention thus provides an auxiliary supply of water when available, and such supply of water is automatically switched into operation when pre-defined conditions exist. The auxiliary water supply can advantageously be rainwater collected in a tank from roof runoff, or the like. The supply of water by the system assures a cost effective supply by first using the water from the auxiliary supply system, and then when such supply is exhausted, the supply of water is switched to the public mains supply of water.

Figure 2:
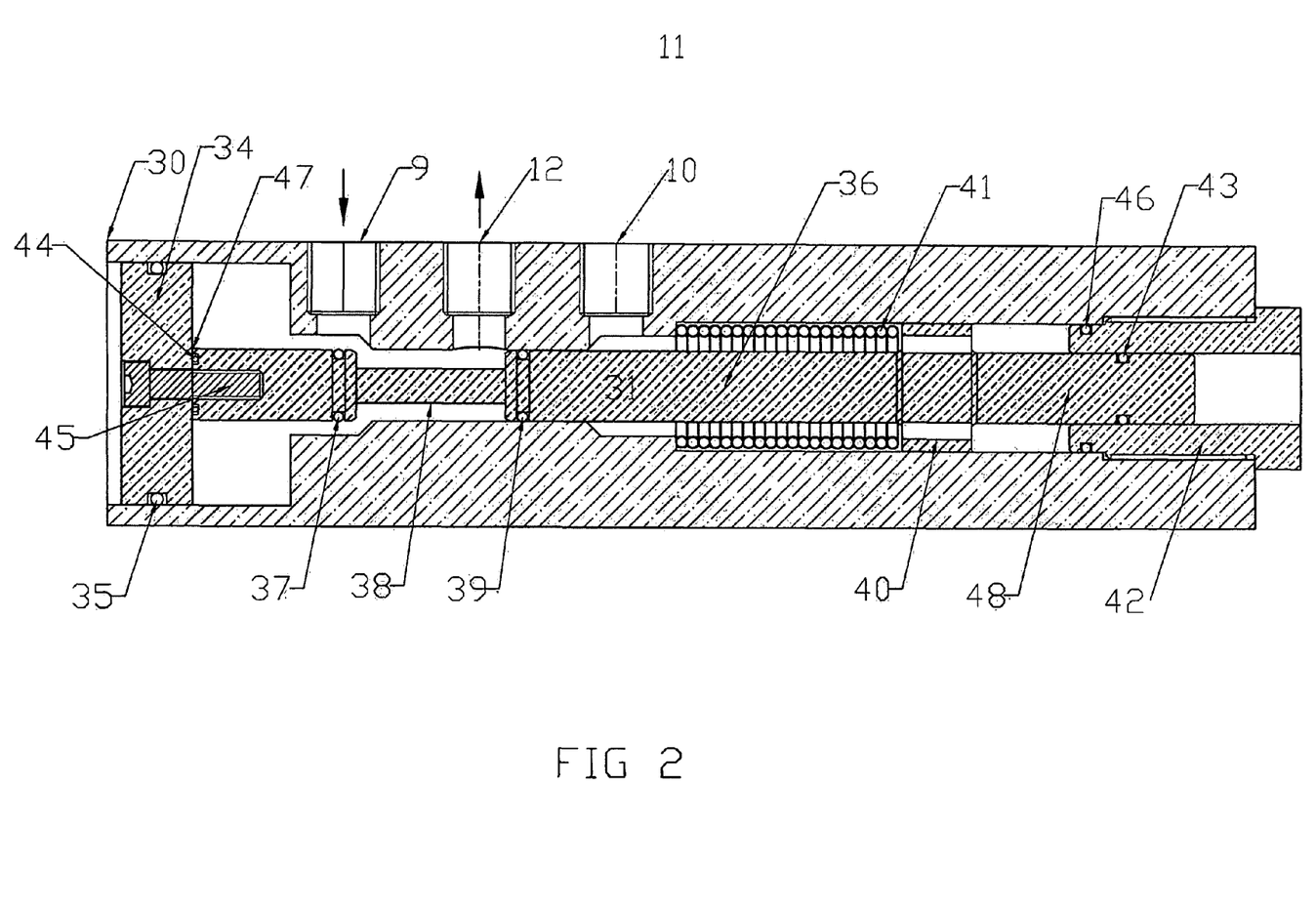
FIG. 2 is a cross-sectional view of a shuttle valve according to the invention, when the shuttle is moved from a default position, in response to water pressure applied to the auxiliary inlet port.

FIG. 2 is a sectional view of the shuttle valve (11). The shuttle valve (11) includes a body (30) and a shuttle (31) with shuttle sections (47, 38, 36, 40 & 48). The shuttle (31) is moved from a default position to a position where it delivers water from the auxiliary inlet port (9) to the valve outlet port (12). With the shuttle valve (11) in this state, the necked down section (38) of the shuttle (31) is between the auxiliary inlet port (9) and the outlet port (12), thus permitting the flow of auxiliary water between such ports. The shuttle (31) is held in this position because the pressure between the ports (9, 12) operates on the enlarged shuttle section or piston (34) at the left hand end of the shuttle section (47), thus forcing the shuttle (31) to the left. When the shuttle (31) is forced to the left, in the drawing, the spring (41) is compressed between a shoulder in the valve body (30) and the enlarged section (40) of the shuttle body (30). Fluid escape from the left hand end of the shuttle (31) is prevented by a first elastomeric seal (35) between the piston (34) and valve body (30), and by a second elastomeric seal (44) between the piston (34) and the shuttle end section (47). Leakage of liquid to the right of the necked down section (38) of the shuttle (31) is prevented by the elastomeric seal (39) between the shuttle section (36) and the valve body (30).

The right hand part of the shuttle section (48) beyond the enlarged section (40) is sealed at the end (42) with elastomeric seal (43). The shuttle end section (42) is designed to be screwed or otherwise removably connected into the valve body (30) and sealed by the elastomeric seal (46) therein. The shuttle section (42) is designed to be connected to the valve body (30) after the shuttle (31) has been installed. The diameter of the shuttle (31) at seal (39) is the same as at seal (43) and therefore the movement of the shuttle (31) does not change the volume between the seals (39) and (43). Therefore, a change in mains pressure at mains inlet port (33) does not tend to move the shuttle (31) to the right. The enlarged section (40) of the shuttle (31) is shown with drilled ports, although it may also be of a fluted design, so as to permit shuttle (31) movement within the valve body (30) without forming a hydraulic restriction. To facilitate assembly of the shuttle valve (11), the piston (34) is attached to the shuttle section (38) by a bolt (45).

Figure 3:
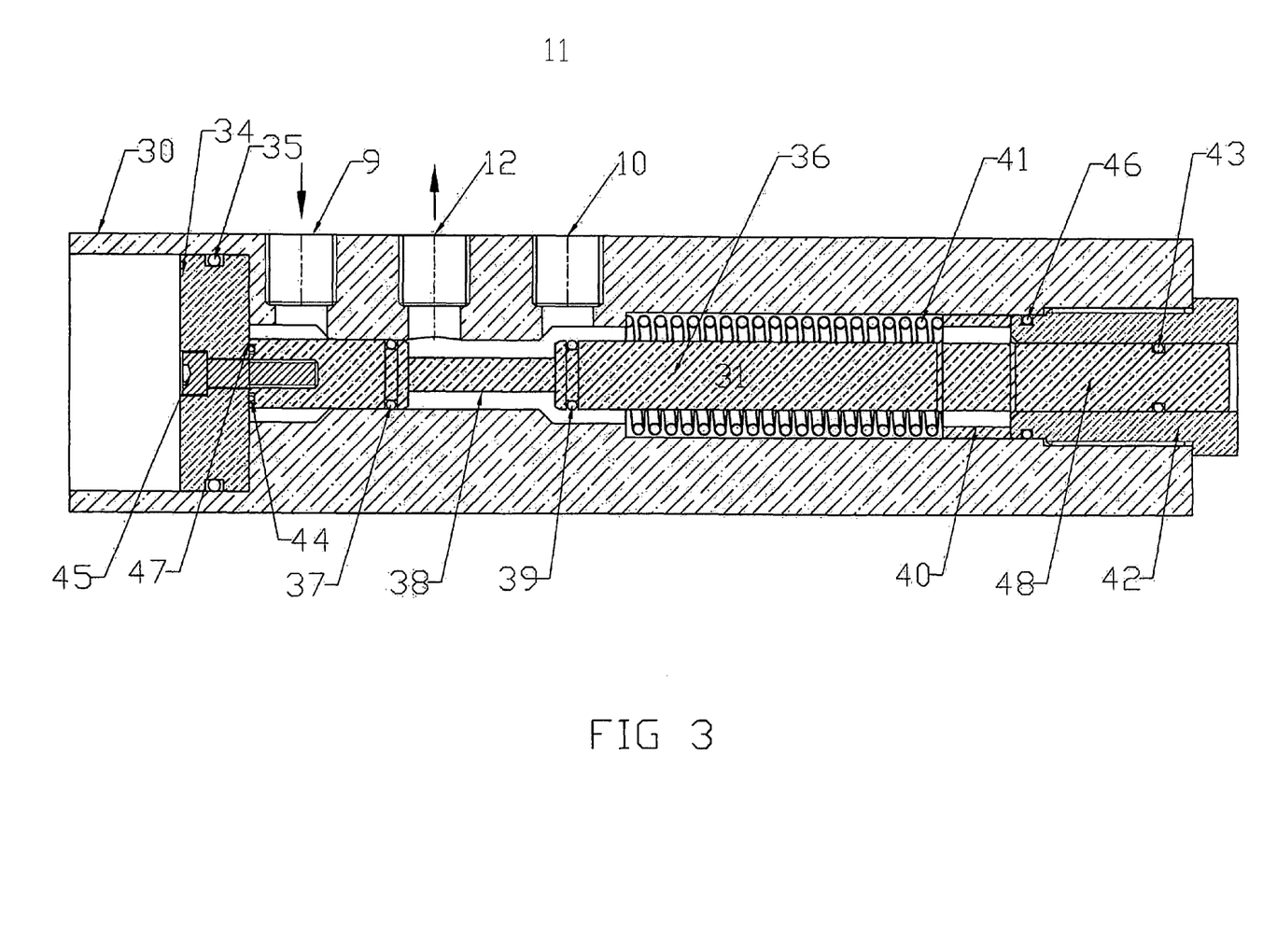
FIG. 3 is a cross-sectional view of the shuttle valve of FIG. 2, but shown in a default condition when the shuttle is in a position to allow water at the mains inlet port to be coupled to the valve outlet port.

FIG. 3 illustrates the shuttle (31) in a rightmost position within the valve body (30), at the default position. The default position of the shuttle (31) is maintained because the pressure at auxiliary inlet port (9) is inadequate to overcome the force of the spring (41). In this state, the shuttle valve (11) permits water flow between the mains inlet port (10) and the outlet port (12). The flow of water through the auxiliary inlet port (9) is prevented by the elastomeric seal (37) on the shuttle end section (42). In the event that the water pressure at the auxiliary inlet port (9) rises to an adequate level, the force on the piston (34) will cause the shuttle (31) to move to the left, causing the seal (39) to seal in the body (30) and prevent water flow occurring from mains inlet port (10) to the outlet port (12). As the shuttle (31) travels further to the left in the drawing, the auxiliary inlet port (9) is connected to outlet port (12), thus permitting the flow of auxiliary water between the two ports (9, 12).

Figure 4:
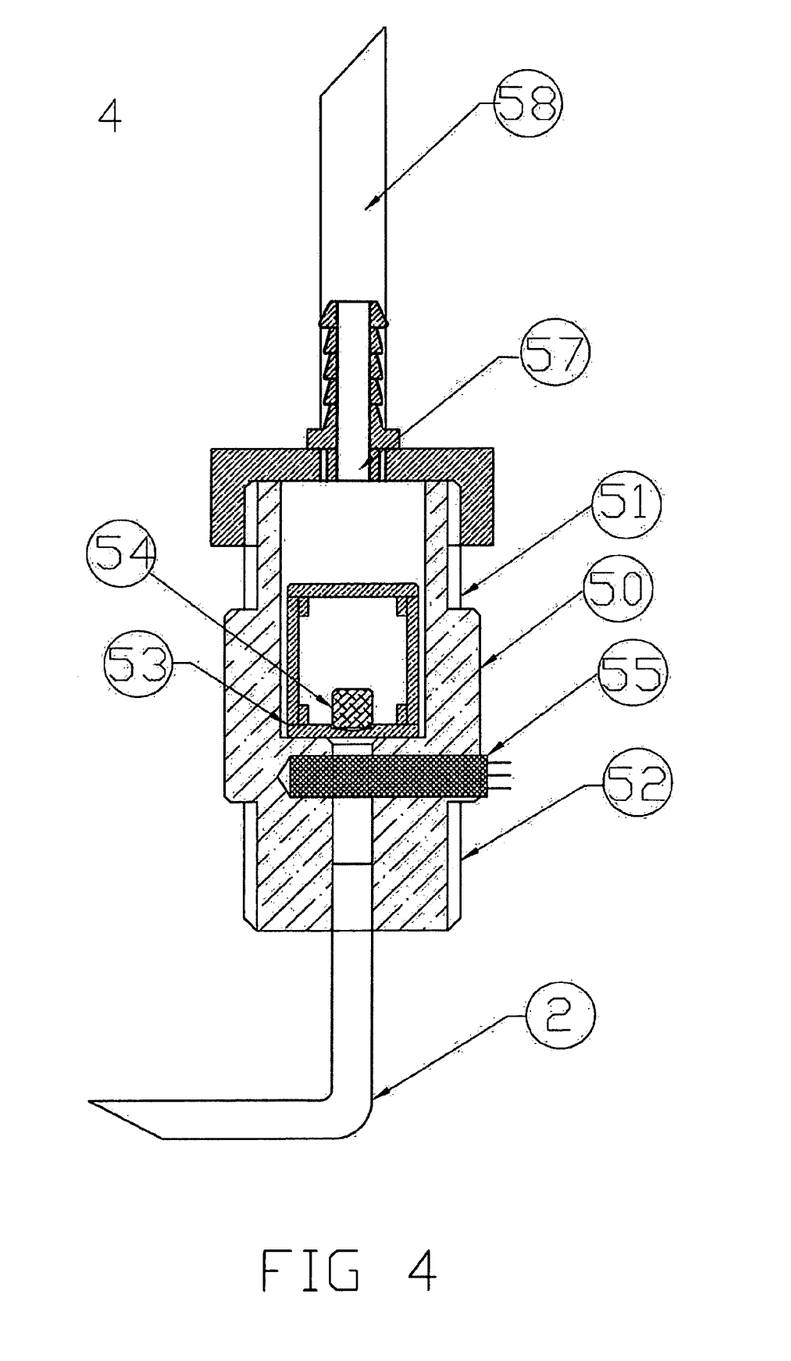
FIG. 4 is a cross-sectional view of a water level sensor constructed according to an embodiment of the invention.

FIG. 4 illustrates the float assembly (4) that detects the presence, or the level of water, in the auxiliary tank (1). The body of the float assembly (4) is shown as numeral (50). For convenience of assembly, the body (50) is shown threaded at the top (51) and the bottom (52). Within the hollow of the centre of the body (50) is a float (53) which has attached thereto a magnet (54). The float (53) can be a hollow non-magnetic container formed as two or more parts so that the magnet can be fastened, such as by bonding, at the bottom of the hollow portion of the float (53). The parts of the float (53) can then be sealed together with the magnet (54) therein.

In the down position of the float (53), the magnet (54) actuates the contacts of a reed switch (55). The float (53) is in the down position when it is near the bottom of its travel, thus indicating a near empty auxiliary tank (1). The water from the auxiliary tank (1) is carried via tube (2) to the float chamber in which the float (54) is situated.

The float body (50) includes a top (51) and bottom (52) portion, threadably fastened together at the threaded part (51). The float (53) can be inserted in to the hollow centre of the float body (50) and then the top (51) can be threadably attached to the bottom (52) part. As auxiliary water flows into the bottom (52) of the float body (50) via the tube (2), the float (4) rises until it abuts against the top (51) of the body (50). The air is vented from within the hollow center of the float body (50) by way of the passage (57), to a vent tube (58). The vent tube (58) is connected to the sight glass (5), shown in FIG. 1. As can be appreciated, the level of water in the auxiliary tank (1) is visible through the sight glass (5). When the auxiliary tank (1) has sufficient water in it, the float (53) will be forced against the top of the hollow centre of the float body (50). As the water is depleted in the auxiliary tank (1), the float (53) will move downwardly within the hollow centre of the float body (50) until the magnetic field of the magnet (54) activates the reed switch (55), whereupon an electrical signal will be sent to the controller (19). In an alternative form it is possible to remove the sight glass (5) and to fit a seal to the top of the float (53) so that when water causes the float (53) to rise it will seal and prevent leakage out of the passage (57).

Figure 5:
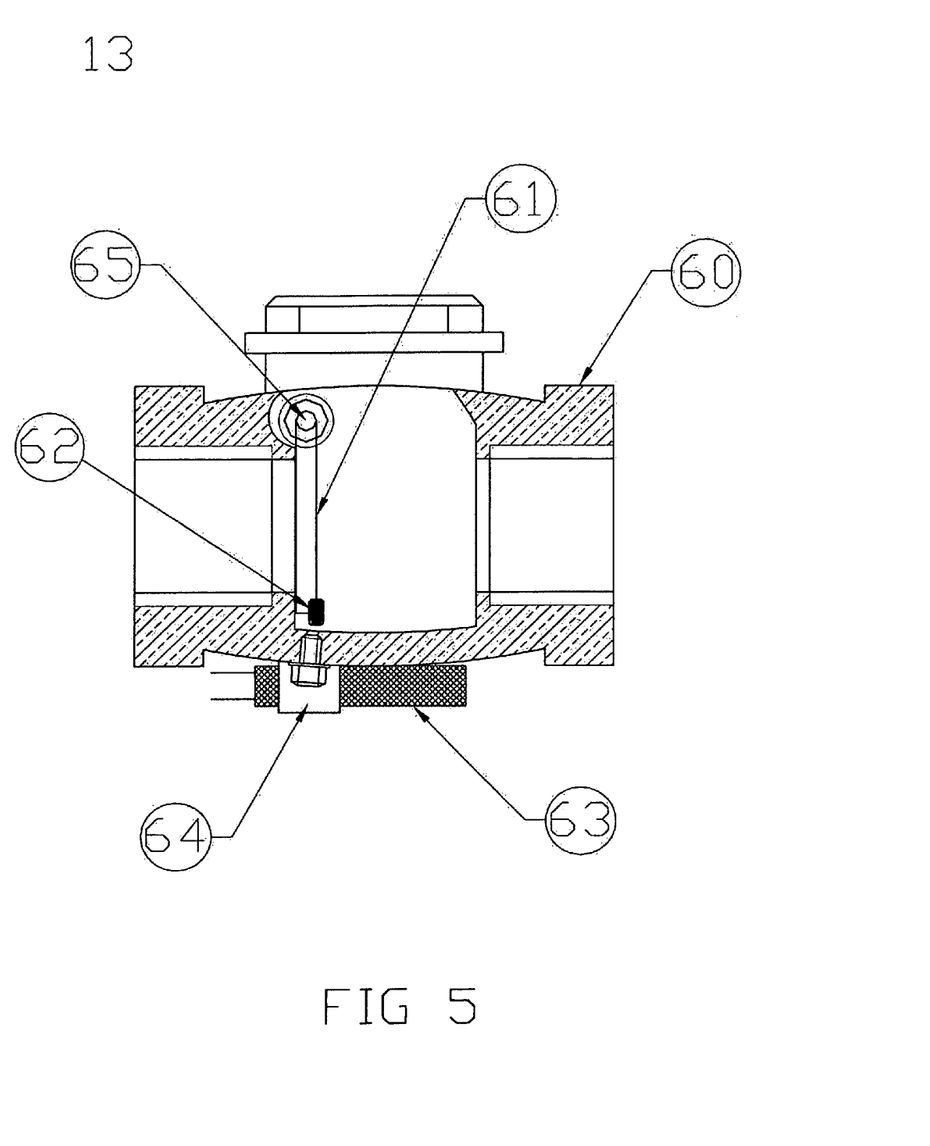
FIG. 5 is a cross-sectional view of a flow sensor constructed according to an embodiment of the invention.

FIG. 5 illustrates the flow sensor (13) in accordance with a preferred embodiment. The flow sensor (13) is a flap type non-return valve with a body (60) equipped with a flap (61) that is hinged about an axis (65). The flap (61) is constructed of brass or plastic material and has a magnet (62) attached to the free end thereof. When the flap (61) is not moved by water flowing through the sensor (13), the magnet (62) actuates a reed switch (63). In other words, the magnetic field of the magnet (62) actuates the contacts in the reed switch (63) when the flap (61) is in the no flow position. The reed switch (63) is shown connected to the valve body (60) by an attachment (64). When water is caused to flow through the sensor (13), the flap (61) rotates about its pivot point (65) anticlockwise (as shown in the drawing) and the reed switch (63) ceases to be actuated by the magnet (62). The contacts in the reed switch (63) couple an electrical signal to the controller (19) to indicate that a demand for water exists.

While the preferred and other embodiments of the invention have been disclosed with reference to a water supply system, and associated equipment, it is to be understood that many changes in detail may be made as a matter of engineering choices without departing from the spirit and scope of the invention, as defined by the appended claims.

I claim:

1. A method of using a shuttle valve for supplying water to a plumbing system from a mains water supply and an auxiliary water supply, comprising:
    coupling water from the auxiliary water supply to an auxiliary inlet port of the shuttle valve which has a movable shuttle;
    coupling water from a mains water supply to a mains inlet port and through the shuttle valve to an outlet port in a default position of the movable shuttle to thereby supply mains water to the plumbing system;
    maintaining the shuttle of said shuttle valve in said default position independently of water pressure at said mains inlet port or said outlet port;
    when water is available from the auxiliary water supply, applying pressurised water from the auxiliary water supply to the auxiliary inlet port of the shuttle valve, wherein auxiliary water pressure moves the shuttle of the shuttle valve from said default position to connect the auxiliary inlet port of the shuttle valve to the outlet port and provide auxiliary water to the plumbing system; and
    removing pressurized auxiliary water from the auxiliary inlet port and allowing the shuttle to move back to said default position in which the mains water supply is coupled through the shuttle valve to the outlet port and thus to the plumbing system.

2. The method of claim 1, further including using a spring to return said shuttle to the default position when pressurised auxiliary water pressure is removed from said auxiliary inlet port of said shuttle valve.

3. The method of claim 1, further including sensing a demand for water by the plumbing system and then allowing pressurized auxiliary water to be coupled to the auxiliary inlet port of the shuttle valve to thereby cause the shuttle to be moved from the default position to couple the auxiliary water supply from the auxiliary inlet port to the outlet port and thus to the plumbing system.

4. The method of claim 3, further including pumping the auxiliary water from the auxiliary water supply to the auxiliary inlet port of the shuttle valve to apply auxiliary water pressure to the auxiliary inlet port and thereby cause the shuttle to move from the default position.

5. The method of claim 3, further including sensing a demand for water by the plumbing system by using a flow sensor.

6. The method of claim 5, further including sensing a first condition of availability of auxiliary water and sensing a second condition of the demand for water by the plumbing system and when the first and second conditions are met, turning on a pump to pump the auxiliary water to the auxiliary inlet port of the shuttle valve.

7. A shuttle valve for use in a water supply system for supplying water from a mains water supply and an auxiliary water supply to a plumbing system, the shuttle valve comprising:
    a mains inlet port for coupling to the mains water supply, an auxiliary inlet port for coupling to the auxiliary water supply, and an outlet port for coupling to the plumbing system;
    a shuttle having a pressure balanced end in which a water pressure applied to said mains inlet port or to said outlet port does not move said shuttle, and having a pressure unbalanced end in which a water pressure exceeding a predefined threshold applied to said auxiliary inlet port moves said shuttle;
    a body in which the shuttle is movable between a i) default position in which the outlet port is connected to the pressure balanced end of the shuttle and to the mains inlet port, but said outlet port is isolated from said auxiliary inlet port in said default position, and a ii) position in which the outlet port is connected to the pressure unbalanced end of the shuttle and to the auxiliary inlet port, and said outlet port is isolated from said mains inlet port;

whereby when the pressure balanced end of said shuttle connects said mains inlet port to said outlet port in the default position, movement of said shuttle is independent of a pressure at either said mains inlet port or said outlet port;

a bias member for maintaining the shuttle in the default position in the presence of mains water pressure applied to the mains inlet port and thus to the pressure balanced end of said shuttle, and an auxiliary water pressure exceeding the predefined threshold applied to the auxiliary inlet port and thus to the unbalanced end of said shuttle overcomes a force of the bias member and causes said shuttle to move; and whereby when auxiliary water pressure is not applied to the auxiliary inlet port of said shuttle valve, the mains water supply is connected to the plumbing system, but when pressurized auxiliary water pressure from the auxiliary water supply is applied to the auxiliary inlet port the shuttle moves from the default position to couple the auxiliary water supply to the plumbing system.

8. The shuttle valve of claim 7, wherein said bias member comprises a spring to return said shuttle to the default position when the pressure applied to the auxiliary inlet port drops below the predefined threshold.

9. The shuttle valve of claim 7, further including a piston attached to the pressure unbalanced end of said shuttle, said piston abutting against a stop in the body when said shuttle is in said default position.

10. The water supply system of claim 7, further including a non-return valve coupled to the outlet port of the shuttle valve, and a hydraulic accumulator coupled to an output of said non-return valve so that an initial supply of water is supplied by the hydraulic accumulator, and said hydraulic accumulator damps flow fluctuations caused by operation of said shuttle valve changing water supplies.

11. The water supply system of claim 10, further including a flow sensor connected to sense water flow through said shuttle valve, and a sensor for detecting the availability of stored water in the auxiliary water supply, and a pump, said sensors provide electrical output signals used to turn on the pump connected to the auxiliary water supply to supply water to the auxiliary inlet port of the shuttle valve.

12. The water supply system of claim 11, further including a controller for processing said electrical output signals, and said controller turns on or off said pump.

13. The water supply system of claim 12, wherein said controller is controlled by logic so that the water in the auxiliary water supply must be available and the auxiliary water flow must exceed a threshold flow through the flow sensor for a defined delay period before the pump is turned on, and when water in the auxiliary water supply is not available or the auxiliary water flow does not exceed the threshold flow, the pump is turned off after a defined delay period.

14. The water supply system of claim 11, wherein said sensor for sensing the availability of water in the auxiliary water supply is connected to an outlet of said auxiliary water supply, and including a sensing tube extending from said sensor into the auxiliary water supply to thereby avoid hydrodynamic changes in a water head of the auxiliary water supply that would otherwise affect the sensor.

15. The water supply system of claim 11, wherein said sensor for detecting the availability of water in the auxiliary water supply includes a float with a magnet attached thereto, and including a reed switch for detecting a level of said float.

16. The water supply system of claim 11, further including a manual override switch to turn the pump on.

17. The shuttle valve of claim 7, further including a non-return valve connected to the outlet port of said shuttle valve, and wherein a pressure sensor is used downstream of the non-return valve.

18. The water supply system of claim 17, wherein the pressure sensor provides an electrical output to a controller, and said controller includes logic such that if there is water in the auxiliary water supply and the pressure drops to a low level at the pressure sensor, then irrespective of an output of a flow sensor that senses water flow through said shuttle valve, the pump is turned on.

19. A method of supplying water to a plumbing system from a mains water supply and an auxiliary water supply, comprising:

coupling water from the auxiliary water supply to a normally closed auxiliary inlet port of a switch valve system;

coupling water from a mains water supply to a mains inlet port of the switch valve system, said switch valve system having a normally open default condition for coupling mains water from the mains water supply through said switch valve system and to an outlet port of said switch valve system;

maintaining said normally open default condition irrespective of a pressure of water at said mains inlet port or said outlet port;

when water is available from the auxiliary water supply, applying pressurised auxiliary water from the auxiliary water supply to the auxiliary inlet port of the switch valve system;

in response to auxiliary water pressure at said auxiliary inlet port of said switch valve system, a) connecting the auxiliary inlet port to the outlet port and thereby provide auxiliary water to the plumbing system, and b) disconnecting the mains inlet port of said switch valve system from the outlet port; and in response to an absence of pressurized auxiliary water at the auxiliary inlet port, placing said switch valve system in the default condition in which the mains water supply is connected to the plumbing system.

20. The method of claim 19, further including sensing a pressure of the auxiliary water output from the auxiliary water supply and placing said switch valve system in the default condition if the auxiliary water pressure is below a predetermined threshold.

* * * * *